April 12, 1955

R. C. MITHOFF ET AL 2,706,254

OPERATION OF PIPELINES

Filed July 12, 1951

INVENTORS
ROBERT C. MITHOFF
DONALD E. HULL

BY
ATTORNEYS

INVENTORS
ROBERT C. MITHOFF
DONALD E. HULL

BY
ATTORNEYS

April 12, 1955     R. C. MITHOFF ET AL     2,706,254
OPERATION OF PIPELINES
Filed July 12, 1951     4 Sheets-Sheet 4
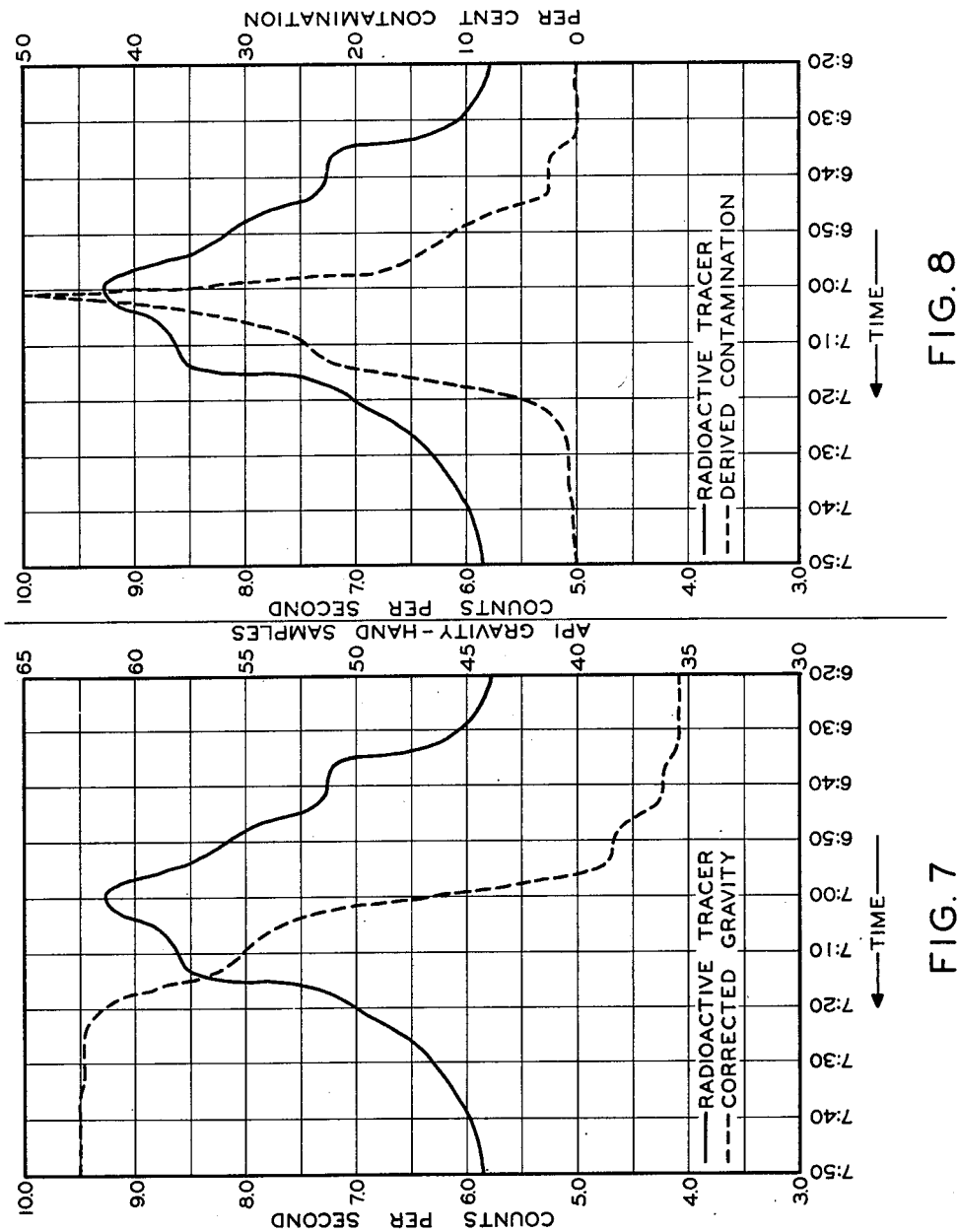
INVENTORS
ROBERT C. MITHOFF
DONALD E. HULL
BY *A. L. Snow*
*Charles J. Gibson*
ATTORNEYS

United States Patent Office 2,706,254
Patented Apr. 12, 1955

2,706,254

OPERATION OF PIPELINES

Robert C. Mithoff and Donald E. Hull, Berkeley, Calif., assignors to California Research Corporation, San Francisco, Calif., a corporation of Delaware Application July 12, 1951, Serial No. 236,384

11 Claims. (Cl. 250—43.5)

This invention relates to the operation of pipelines employed to transport fluid substances, and in particular to a method and the apparatus for determining the position of an interface between successive adjacent quantities of different materials being transported through the line and the characteristics of the intermixing of the substances in the region of the interface.

The principal objects of this invention are: to provide a means for marking an interface between sequential quantities of fluid substances in a common pipeline; to provide a method for determining the position of such an interface without disturbing the flow of the substances through the pipeline or withdrawing any of the material therefrom; to provide a means for determining the amount of contamination of one substance by another adjacent one in the region of intermixing of substances successively placed in a common pipeline; to provide a method for diverting as desired known substances from the pipeline without contaminating such substances as are diverted with other adjacent substances flowing through the common line; and to provide a method for diverting as desired from the common pipeline known substances containing only predetermined portions of other adjacent substances as contaminants. Other objects will be obvious, or will become apparent, as the description proceeds.

To accomplish these objects, the invention comprises the use of a radioactive tracer material which is injected into a pipeline at the interface between two substances which have been placed therein in sequential adjacent relationship. A tracer material is employed which will have the proper characteristics to intermingle readily with the substances in the pipeline and which will be carried in the interface and distributed throughout the region thereof as the interface merges into the adjacent substances, in varying degrees in accordance with the manner in which the adjacent substances intermix due to conditions of flow or other peculiarities of pipeline operation. Appropriate instruments are provided for detecting the radioactivity of the tracer material, and for measuring the amount of radioactivity of different portions of the region of intermixing to determine therefrom the amount of intermixing that has occurred. Provision is made for using the radiations from the radioactive tracer to cause a signal to be actuated in a station or a depot on the pipeline prior to the arrival of the interface at that point to permit the operators of the station to be prepared to receive a new substance and handle it as required.

To aid the disclosure of the inventive concept, one specific embodiment of it will be illustrated and described.

Fig. 7 illustrates in graph form comparison of data relating to an interface region obtained by a gravity method and by the radioactive tracer method.

Fig. 8 illustrates in graph form a comparison between the radioactive tracer data and derived contamination relationship of an interface region.

Figure 1:
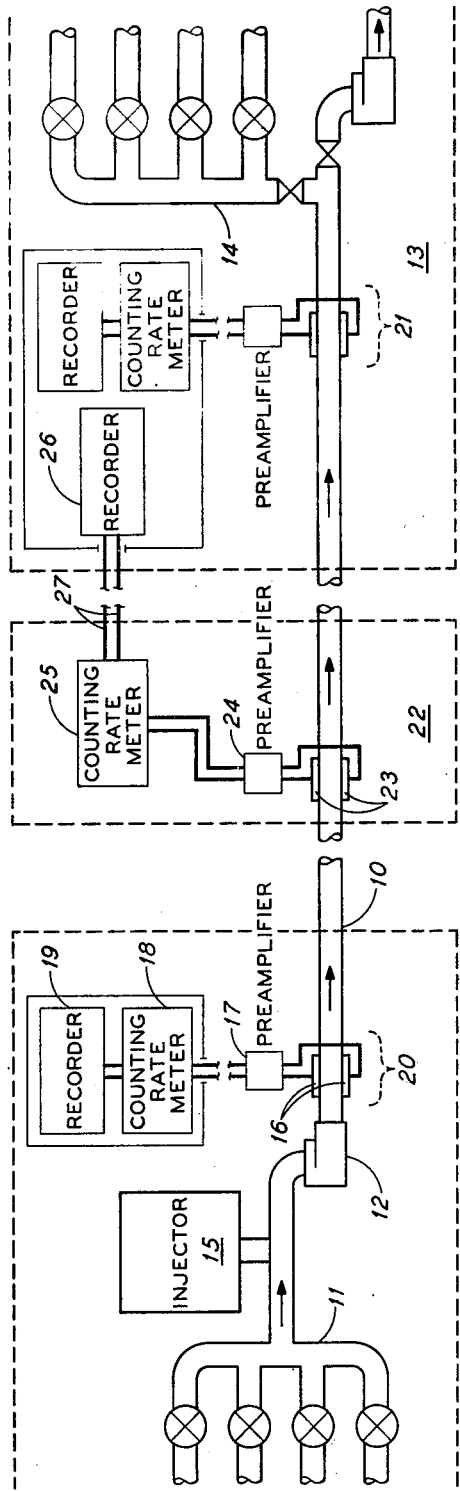
Fig. 1 is a diagrammatic representation of a petroleum products pipeline together with the concomitant apparatus employed in this invention.

Fig. 1 represents this invention as applied to a petroleum products pipeline 10 which is designed to receive various predetermined quantities of different petroleum products from their respective storage tanks through a manifold arrangement 11. A pump 12 is employed which receives the products from the manifold on its suction side and discharges such products from its compression side into the pipeline, and forces them thence through the line. The pipeline may extend a distance of several hundred miles, and have various stations located along its length where products may be diverted from the line for use in that area. At a diversion station or take-off point, represented by the numeral 13, provision is made for segregating different products through a manifold 14 to appropriate tanks. The terminal station, which is not shown in Fig. 1, may be similar to the diversion station in providing a means for segregating the products received there, all of which is well known in the art.

Since the different petroleum products are transported sequentially under continuous flow conditions in a common pipeline, it is important to distinguish the boundary between adjacent products so that upon arrival at a take-off point or at the terminal of the pipeline the various different products may be diverted and segregated in their respective tanks with a minimum amount of contamination from other adjacent products. This problem becomes complicated in longer pipelines where, due to the conditions of flow or pipeline operations, the products will have intermixed to some unknown degree at the region of the interface. In those cases where some contamination is allowable, it is necessary to know the varying degrees of intermixing that has occurred so that the cut between the products can be made at the proper point to produce the maximum amount of usable product and the least amount of product that must be downgraded or reworked.

Formerly two methods have commonly been used for this purpose; the measurement of density change by a gravitometer and the observation of color change by a colorimeter. Neither method would work in all cases. Both methods entail either the withdrawal of samples from the products flowing through the pipeline or the bypassing of a portion of the stream of products to instruments for detecting changes therein. In each case a delay ensued between the time the change of products actually took place in the pipeline and the time such change could be measured. During the delay period, the region sampled continued to flow along the pipeline from the point where the samples were taken, and if the delay were prolonged, the region may have passed sufficiently beyond the diversion point to make it difficult or impossible to divert the flow from the pipeline at the optimum time. The present invention overcomes these difficulties by the use of a radioactive tracer, the presence and quantity of which can be detected instantly through the wall of the pipe. Thus, the operator can obtain an instantaneous and precise determination of the position and characteristics of the critical region.

The tracer may be injected into the pipeline at any point where it can conveniently be placed at an interface between the products therein. One such point is a location between the suction side of the pump and the manifold through which new products are introduced into the line. At this point, the tracer may be injected into the line at the time a new product is cut into the stream. Numeral 15 represents an injector located in such a position. It is desirable to make the injection rapidly so that it will enter the interface region substantially as a slug of material.

Figure 2:
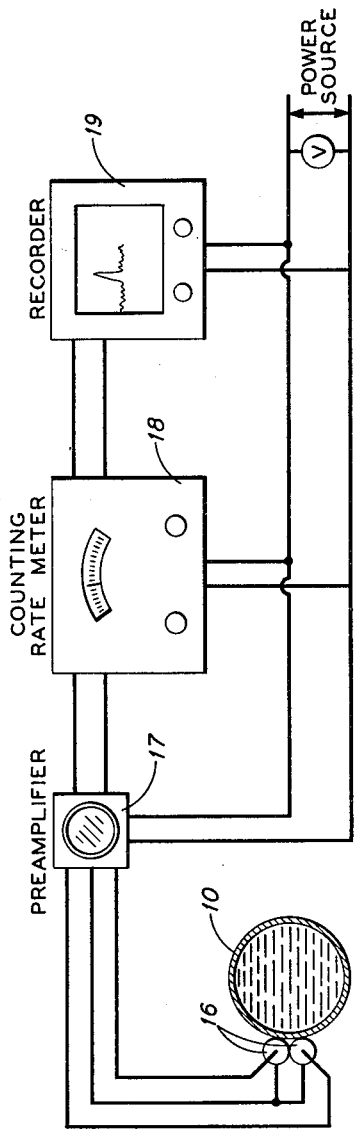
Fig. 2 is a schematic representation of a device suitable for detecting radiations from the radioactive tracer material in the pipeline.

The radiations from the tracer material may be detected by a Geiger tube, scintillation counter or other appropriate detector, which may be placed within the pipe or adjacent an outside wall of an exposed portion of the pipeline. The detector is connected to appropriate apparatus for indicating and recording the presence of radioactive material at the position of the detector. As represented in Figs. 1 and 2, the detector station comprises a plurality of Geiger tubes 16 mounted upon the pipe and connected to a preamplifier 17, a counting rate meter 18 and a recording instrument 19. Obviously, the Geiger tubes and the related apparatus will be connected to an appropriate source of power. The counting rate meter is employed to give an instantaneous reading of the radioactivity influencing the Geiger tubes, and the recording instrument makes a permanent record of the variations of radioactivity affecting the tubes throughout a measured time interval. For some installations, it is desirable to adjust the recording instrument to decrease the effect on it of background radiation. The number of Geiger tubes employed at a station may vary from one to several, depending upon the sensitivity of detection desired.

As illustrated in Fig. 1, a plurality of detector stations are set up along the pipeline at predetermined positions. The first detector station in sequence, designated by the numeral 20, is positioned at the first pumping station. Its specific location may be at, although it is not limited to, the discharge side of the pump. At this position the intensity and duration of passage of the radioactive tracer injected into the pipeline from the injector 15 can be initially determined. From the data obtained at station 20, the quantity of radioisotope deposited in the pipeline may be determined for future reference.

The second principal detector station may be located at the first take-off or diversion point of the pipeline, on the upstream side of the manifold as represented by the numeral 21. Here the approaching interface region will be detected and measured, and the proper provision made by the station operator to divert the incoming products as required. Other principal detector stations, substantially duplicating station 21, will be located at other take-off points and at the terminus of the pipeline.

When a heart cut is to be taken from one of the products passing through the pipeline, it is necessary for the station operator at the take-off point to know only when the interface region preceding the product has passed the station so that the cut can be taken from the uncontaminated portion of the product. A principal detector station arrangement will suffice for this purpose. However, when the full quantity of a particular product is to be diverted from the pipeline, or when the different products are to be segregated into their respective tanks, as at the terminus of the line, it is desirable for the station operator to be informed of the imminent arrival at his station of the interface region between products, and to obtain an indication of the conditions of intermixing between the adjacent products, so that he may be prepared to divert the various products at the optimum time.

To accomplish this, an auxiliary detector station is placed on the pipeline at a position upstream of the diversion station. Such an auxiliary station is indicated in Fig. 1 by the numeral 22. The auxiliary station is desirably placed a distance from the principal station equal to or greater than the length of the intermixed region between adjacent products.

The auxiliary station comprises a radiation detector, which may be a plurality of Geiger tubes as in the principal station, mounted adjacent the pipeline and connected to appropriate instruments to indicate and record the variation in radioactivity in the pipeline products passing that point, and with provision to transmit such information ahead to the principal station. In the specific embodiment illustrated, Geiger tubes 23 are mounted on the outside wall of the pipeline and connected to a preamplifier 24 and counting rate meter 25, all at the location of the auxiliary station. A recording instrument 26 is mounted in the principal station and connected by appropriate electrical conductors 27 to the detector arrangement of the auxiliary station. As the radioactive tracer passes the auxiliary station, the instrument 26 in the principal station will record its passage and also the variation of radioactivity in the intermixed region.

With this knowledge, the operator of the station will be prepared for the arrival of the new product, and will have prior information of the degrees of intermixing throughout the interface region. When the radioactive tracer is picked up by the detector and associated instruments at the principal station, at a time which can be predicted from the known rate of flow of the products and the distance of the principal station from the auxiliary station, the operator will have available sufficient information to make the optimum cuts of the products.

The counting rate meter at the auxiliary station permits the variation in radioactivity to be determined by an operator at that specific locality, if desired. It is contemplated by this invention that other means than a recording instrument can be used at the principal station to inform the operator there of the arrival of the interface region at the auxiliary station, and also that signalling means, such as lights, bells, and the like can be used separately or in addition to the recording instrument. Also, it is contemplated that information from the auxiliary station can be transmitted to the principal station by other means than wire, as, for instance, by radio.

There are three general requirements which are desirable in a radioisotope to be used successfully as a tracer in pipelines:

(1) It should emit penetrating gamma rays.

(2) It should have a half life at least comparable with the duration of its time of travel through the pipeline.

(3) It should be present in a stable compound which will intermix readily with the products in the pipeline.

One isotope which meets these conditions is barium-140. This isotope has a half life of 12.8 days and emits beta rays along with 0.5 m. e. v. gamma rays. The product of disintegration is lanthanum-140, which also is radioactive with a half life of 40 hours, and which emits a gamma ray of 1.6 m. e. v. It is the lanthanum gamma ray which contributes most to the detection of the tracer by a detector placed outside of the pipe.

The barium isotope can be obtained from the fission of a heavy element in an atomic pile. To make a tracer material suitable for use in a petroleum products pipeline, the radioactive barium may be converted to an oil-soluble compound, an alkyl phenate which can be dissolved in oil. The oil solution may be used as a tracer material.

Another isotope suitable for this purpose is antimony-124. A suitable compound in which to incorporate the antimony for tracer use in petroleum products pipelines is triphenylstibine. The compound may be synthesized from irradiated antimony metal, or the compound may be made from nonradioactive components and then irradiated in an atomic pile. Under the latter conditions the compound partially decomposes, but when the irradiated samples are treated with hydrocarbon solvents, an appreciable percentage of the radioactive antimony may be extracted in the form of the original compound. The solution thus obtained is stable to air, water, and to dilute acids and bases and does not leave a significant deposit on the walls of the injector apparatus or the pipelines after long periods of contact. The radioactive triphenylstibine can be dissolved in an oil carrier to make a fluid tracer material.

A quantity of the tracer material having a radioactivity of one millicurie was found sufficient to make interface determinations in most pipelines. However, more or less may be used depending upon the length of the pipeline and the spread of the interface region resulting from flow conditions and line operation.

To compare the radioactive tracer technique with other methods of marking the interface region, tests were made in a pipeline (here designated as line M), 24 miles long, constructed of 6 in. and 8 in. pipe, through which the products had a normal flow velocity of 3.61 ft. per second at the terminus. A radioactive tracer was injected at the beginning of the line at the interface between two grades of gasoline. For the purposes of this test, care was taken to inject the tracer as nearly as possible exactly in the interface, and this was accomplished with an error of timing of less than five seconds.

A radiation detector and its associated apparatus were mounted at the end of the line to determine the characteristics of the interface region by the radioactive tracer technique, and observations of the critical region also were made using a gravitometer and colorimeter. Direct comparison of the various methods was thereby afforded.

Figure 3:
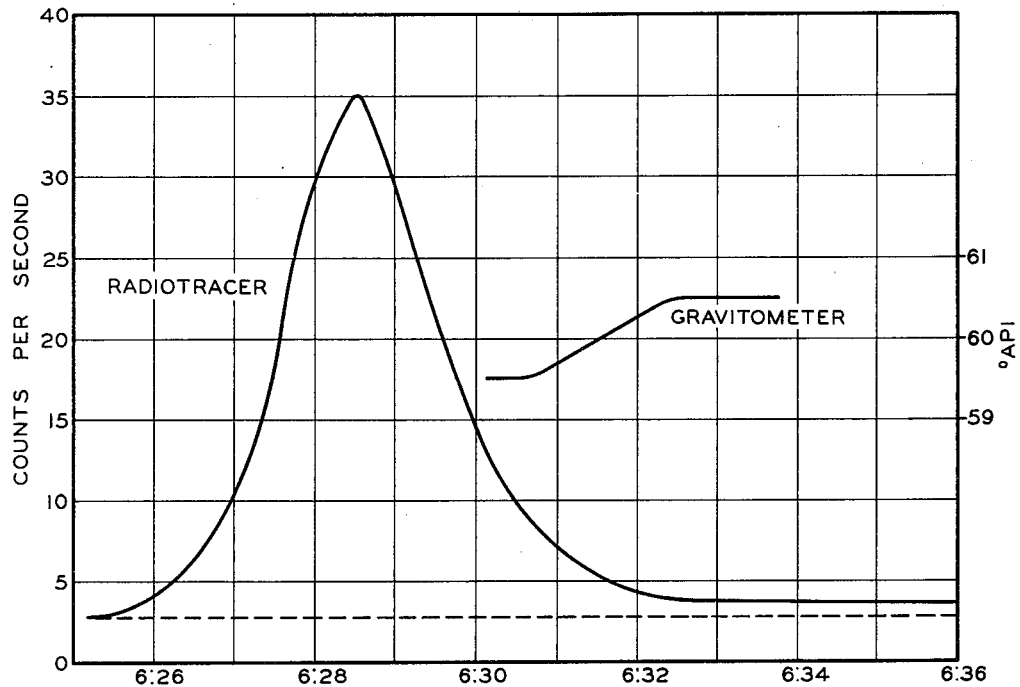
Fig. 3 illustrates in graph form a comparison between data obtained by the radioactive tracer technique and that obtained from a gravitometer.

Fig. 3 illustrates in graphic form the radioactive tracer record and the gravitometer record, each shown on the same time scale. The first indication of the approach of the interface was detected in the counting rate meter approximately four and one-half minutes before the gravitometer began to respond to changes in density of the products. Approximately forty seconds of this time can be attributed to the volume of the pipe and a filter tank located between the two instruments. The remainder of the time was that required to fill the gravitometer. The changing color of the products was observed simultaneously with the response of the gravitometer. The peak of the radioactive wave, which corresponds to the mid-point of the interface region, occurred approximately three minutes before the mid-point of the gravitometer record. It will be noted the tracer curve is drawn out in its trailing portion in this graph. This peculiarity has been observed in other tracer records, and is due primarily to some conditions of viscous flow and the particular operation of the pipeline occurring during the transit of these products. It will be discussed more fully later.

It is apparent that the radioactive tracer method is more sensitive and responds more immediately to changes in the products in the pipeline than either the gravitometer or colorimeter methods.

Injections of radioactive tracers have been made in other pipelines, and the various characteristics of intermixing produced at the interfaces between consecutive products have been determined for the line operating under normal conditions. One pipeline (here designated as line N), used in the test was a 10-inch diameter pipe 182.5 miles long through which products normally flowed with a velocity of 2.68 feet per second. Detection instruments were placed at various distances along the line to determine radioactivity from the interface as it passed each point. When the tracer was first injected, it was concentrated in a narrow band and the detection instruments showed its passage as a wave of high intensity and very short duration. As it traveled along the pipe, the tracer material spread into the adjacent liquid on both sides of the interface so that subsequent observations showed a continuously broader wave form of smaller amplitude.

The extent to which the interface spreads with distance of travel along the line is a characteristic of great importance in pipeline operation. In order to have a common basis for comparison of different interfaces, the width of the wave at the level where activity is 50% of the peak value has been chosen. This value is represented hereinafter by the symbol $w_{0.5}$. Thus, the spread of tracer waves of varying sizes can be compared quantitatively. The half-value widths of the waves formed by different injections into pipeline N are presented in Table I. The half-widths are presented as the number of seconds required for this portion of the curve to pass the counting instrument. These figures may be converted to feet of length by multiplying by 2.68, which is the foot-per-second rate of flow of the products through the pipeline. It will be noted that at a given station all of the interfaces have substantially the same width.

TABLE I

*Half-widths of radioactive tracer waves*

| Station | Milepost | Injection Number | | | | | Avg. |
|---|---|---|---|---|---|---|---|
| | | 1 | 2 | 4 | 5 | 6 | |
| | | Seconds | Seconds | Seconds | Seconds | Seconds | Seconds |
| 1 | .062 | 17.0 | 15.8 | 21.2 | | | 18.0 |
| 2 | 1.9 | 69 | 69 | | | | 69 |
| 3 | 13.8 | 210 | 198 | 224 | | | 211 |
| 4 | 43.1 | 410 | 388 | 402 | | | 400 |
| 5 | 108.5 | 670 | 644 | 690 | 670 | 715 | 678 |
| 6 | 108.5 | 670 | 635 | 730 | 650 | 660 | 669 |
| 7 | 125 | 745 | 735 | 805 | 715 | 730 | 746 |
| 8 | 182.5 | 850 | 850 | 865 | 980 | 940 | 895 |

(Length of the half-value region equals seconds×2.68 ft./sec.)

Under standardized conditions of flow and measurement and with appropriate corrections for radioactive decay, the total number of counts recorded from a passing wave is constant regardless of the particular shape of the wave. This constancy of total count may be illustrated by results obtained in pipeline M mentioned heretofore where measurements of the total count of radioactivity in an interface region passing through the line were made as three widely-spaced points. The results are listed in Table II below.

TABLE II

*Total counts of wave at various stations*

| Milepost | Pipe Size | Counts |
|---|---|---|
| 1.5 | 8 | 5,020±140 |
| 14.5 | 8 | 4,920±180 |
| 24.5 | 8 | 4,790±180 |

It will be noted that the total count at each point is constant within the error of counting.

As the products are transported through the pipeline, they carry with them the interface into which the radioactive tracer material has been injected. The adjacent products intermix across the interface during their flow, and the tracer material is carried both ahead of and behind the original plane of the interface. The function for the activity of the tracer in terms of time and displacement along the pipeline, measured from the point of injection, may be derived from the differential equation for mixing by diffusion, as follows:

$$\frac{da}{dt} = D\frac{d^2a}{dx^2} \quad (1)$$

where:

$a$=radioactivity of a unit portion of the tracer labeled products
$x$=relative displacement of the unit portion "$a$" from the plane of the interface
$t$=time after injection
$D$=a quasi-diffusion coefficient D is similar in form and dimensions to a molecular diffusion coefficient, but larger by a factor of approximately $10^9$, since the movements within vortices in turbulent flow are of much greater magnitude than molecular free paths.

The integrated equation may be written in the form $$f = \exp\left[-\left(\frac{x}{w}\right)^2\right] \quad (2)$$

where $$f = \frac{a}{A_L}$$

$A_L$=peak value of "$a$," which occurs at the plane of the interface when it has traveled a distance L from the point of injection
$L$=velocity×time
$w$ is a width parameter $$w = \sqrt{4Dt} \quad (3)$$

$A_L$ decreases with time as the interface moves along the pipe in accordance with the formula $$A_L = At^{-\frac{1}{2}} \quad (4)$$

where $A=$ value of $A_L$ at one second after the time of injection.

Equation 2 may be written in the equivalent logarithmic form $$\left(\frac{x}{w}\right)^2 = -\log_e f \quad (5)$$

This equation is the mathematical expression describing the tracer wave.

For any arbitrary value of the fraction "$f$" of the peak activity, there is a corresponding width of the tracer wave, defined by the equation $$\left(\frac{w_f}{2w}\right)^2 = -\log_e f \quad (6)$$

In a given pipeline having a steady rate of flow therethrough, D, the quasi-diffusion coefficient, should be constant. The value of D has been calculated from various values of $w_{0.5}$ for the half-wave width and the distance "L" from the data listed in Table I. The average of all the calculated values of D for this pipeline was 1.28±0.22 ft.² per second.

Figure 4:
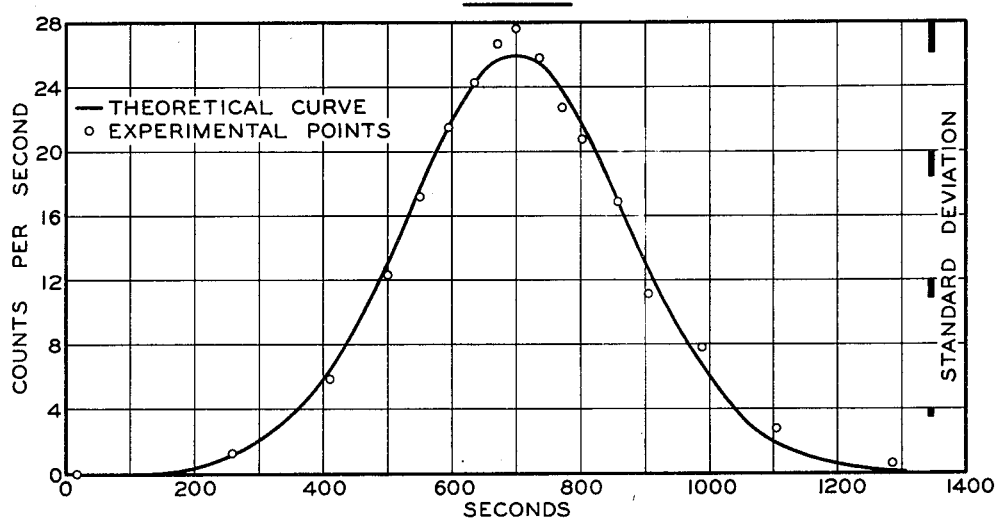
Fig. 4 illustrates in graph form a comparison between the theoretical and experimental distributions of a radioactive tracer in an interface region.

The accuracy with which Equation 2 represents an experimental curve is illustrated in Fig. 4 in which are plotted the counting rates observed during the passage of one interface in pipeline N at station 43 miles downstream from the point of injection. The solid curve shown is calculated from Equation 2 with the parameter "A" determined from the size of injection and the parameter "D" taken as the average of all values calculated as explained above. It will be noted that the experimentally determined points fall on the calculated curve within the accuracy of the counting instruments. Thus it is demonstrated that the normal probability curve, as expressed in the form of Equation 2, represents the distribution of the tracer which results from turbulent mixing in pipeline flow. This justifies the application of the relationship for mixing by diffusion to mixing in turbulent flow in pipelines.

Figure 6:
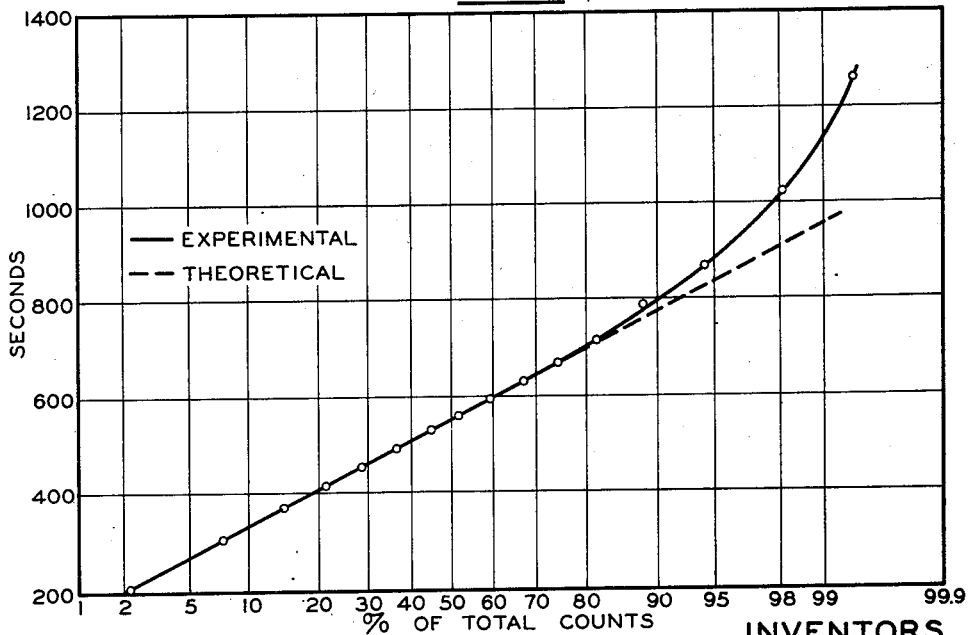
Fig. 6 illustrates in graph form a comparison between the theoretical and experimental relationships derived from the radioactive tracer method.

No appreciable deviation from the probability curve is apparent in the experimental wave when plotted on rectangular coordinates. However, if the integral of the counts, corrected for background count, is plotted against time on probability coordinate paper, the theoretical curve is a straight line and deviations from the theoretical distribution become more readily apparent. When the data are presented in this manner as illustrated in Fig. 6, there is revealed a small tail on the experimental wave form. It is assumed that this is a result principally of the laminar flow in the portions of the pipeline fluids adjacent to the inner wall of the pipe.

It can be shown that when a tracer is injected in an interface between two consecutive liquids "J" and "K," at the moment it is formed, the concentration of one of the liquids across the interface at any subsequent time is given by the normalized integral of the tracer activity.

$$C = \frac{1}{\sqrt{\pi}w} \int_{-\infty}^{x} \exp\left[-\left(\frac{x}{w}\right)^2\right] dx \quad (7)$$

where $C$=concentration of the liquid "K" which follows the interface.

Further, the integral of the concentration gives the quantity of the product which has passed a given point. Thus $$Q = \pi r^2 \int_{-\infty}^{x} C \, dx \quad (8)$$

where $r$=radius of the pipe.

Figure 5:
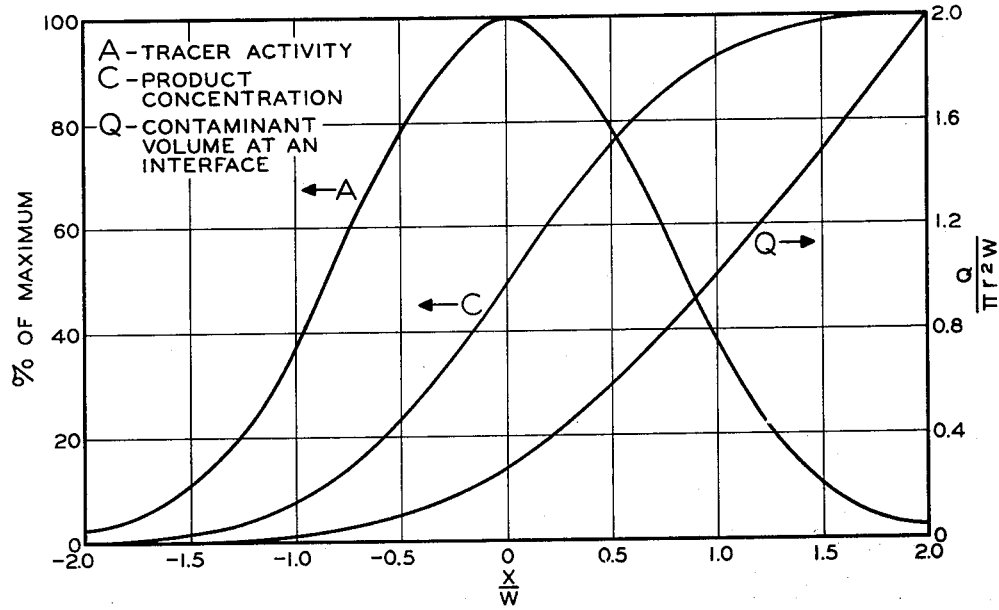
Fig. 5 illustrates in graph form the relationship of intermixing of the products as related to the radioactive tracer technique.

In Fig. 5 are plotted, in terms of the characteristic width parameter $w$, the activity "A" of the tracer wave, the concentration "C" of the product "K" which follows the interface, and the volume "Q" of "K" which has flowed past the detection station. This graph, together with the value of $w$ at a given station, can be used to calculate the extent of intermixing from measurements of the tracer activity.

As an illustration of such a calculation, consider a wave arriving at the terminus of pipeline N and having a width at 50% level of 2240 feet. The parameter $w$ for this specific condition can be calculated by Equation 6.

$$-\log_e 0.5 = \left[\frac{w_{0.5}}{2w}\right]^2 \quad w_{0.5} = 1.668w$$

Thus $w$ equals 1340 feet at the terminus of the pipeline. Multiplying by the cross-section of the pipe gives the equivalent volume, 134 barrels. From the graph, the 10–90% concentration range is seen to extend between $x/w = \pm 0.907$ or 2430 feet. Similarly, the 1–99% concentration range extends between $x/w = \pm 1.645$, or 4410 feet. Observed values of the 10–90% range, on probability coordinate plots, agree well with the calculated values. Because of the tail on the interface, observed 1–99% values vary from 10 to 50% higher than the theoretical. At the 10% concentration level, only five barrels of "K" have flowed past the counter, but the counting rate is already 45% of its peak value. Even the 1% concentration level is marked by 6.7% of the count rate; at this point only 0.1 barrel of "K" has contaminated "J." These figures illustrate the large factor of sensitivity gained by the use of the radio-active tracer technique as compared with a differential measurement of a property depending on concentration.

Under some conditions of pipeline operation, it is not necessary to know the specific form of the curve of contamination in the region of the interface. For example, when a gasoline-gas-oil interface arrives at a station, usually there is no attempt made to blend a portion of the intermixed region into the leading or following product, but the entire mixed region is diverted to a special tank for other processing. Therefore, with such interfaces only the points of beginning and end of intermixing need be determined to make a proper cut. On gas-oil to gas-oil or regular gasoline to premium gasoline interfaces, the intermixed region may be diverted to the lower quality product. In such cases only the point of beginning or of the end of the intermixed region need be determined to make the proper cut. When shipments are made of adjacent quantities of like products with an interface between them, the cut will be made at the center of the intermixed region which will be at the peak of the tracer curve.

Tests have been made on a pipeline, designated here as pipeline "O," 569 miles long and having various pumping stations and distribution stations located on it. To determine the usefulness of the radioactive tracer technique under such rigorous circumstances, the characteristics of interfaces arriving at the terminal of the line were investigated by the gravity method and the radioactive tracer method, each for the same interface. Because of starting and stopping of the flow of products during the operation of the pipeline, and because of the equipment the products must pass through at various points between the beginning and the terminus of the line, the interface region was disturbed. The tracer curve no longer conformed to the theoretical shape, nor did it correspond exactly to the curve of the interface region found in pipelines having more uniform flow conditions.

Fig. 7 represents, in graph form, a comparison of the data obtained at the terminus of pipeline "O" by the radioactive tracer method and by the gravity method for an interface region between diesel oil followed by gasoline. The time scale proceeds from right to left of the graph in the same relationship as the interface approaches the test station. Neither of the curves produced by either method is symmetrical. However, each curve has corresponding points of inflection.

The radioactive tracer began registering some minutes before the gravity method responded. Both curves reach maximum change at approximately the same time. The curve of radioactivity reaches background datum some minutes after the gravity has leveled off.

With the gravity of the leading and following products known, a blend chart can be used to obtain the percent of mixing of the products at various sampling points throughout the region of the interface. From such data a curve can be drawn showing the percent contamination of one product by the other in this region.

Fig. 8 represents such a curve derived from the data obtained from the same interface as is represented in Fig. 7, and with the radioactive tracer curve drawn on the same graph.

The percent contamination curve may be integrated to give the contamination in barrels of undesired product. This result can then be correlated to different points on the tracer curve. The result of such a study is shown in Table III for the same interface illustrated above.

TABLE III

| Point on Tracer Curve | Contamination (Barrels) | |
|---|---|---|
| | "K" in "J" | "J" in "K" |
| Leading Edge—First Break | 1.5 | |
| Trailing Edge—90% Level | | 16 |
| Trailing Edge—80% Level | | 5.0 |
| Trailing Edge—70% Level | | 4.0 |
| Trailing Edge—60% Level | | 2.5 |
| Trailing Edge—50% Level | | 2.0 |
| Trailing Edge—40% Level | | 1.5 |
| Trailing Edge—30% Level | | 1.0 |
| Trailing Edge—20% Level | | 0.2 |

The first break in the tracer curve is taken at the time the tracer curve had risen ¾ count above average background at the approach of the interface. At this time there was 1.5 barrels contamination of the leading product by the following. When the tracer count had fallen to 20% of its peak value, there was 0.2 barrel contamination of the following product by the leading.

By employing this method, the radioactive tracer data can be used to cut into the interface region at the optimum time to hold the products within allowable limits of purity. In those cases where it is desired to separate the intermixed region from both products and divert it for special processing, the described method enables the quantity thus diverted to be held to a minimum. Table IV presents a comparison of the volumes of products in various portions of the interface region described heretofore.

TABLE IV

| Point on Tracer Curve | Volume of interface region from first break in tracer curve to selected point (Barrels) |
|---|---|
| Trailing Edge—90% level | 300 |
| Trailing Edge—80% level | 367 |
| Trailing Edge—70% level | 377 |
| Trailing Edge—60% level | 396 |
| Trailing Edge—50% level | 426 |
| Trailing Edge—40% level | 445 |
| Trailing Edge—30% level | 464 |
| Trailing Edge—20% level | 483 |

It will be noted from the data presented in Tables III and IV, if it is permissible to have a contamination of 2 barrels of diesel oil in the bulk of gasoline following it, the end cut of the interface region can be made on the trailing edge of the tracer curve at the 50% level. Assuming the lead cut was made at the first break, the amount of intermixed products diverted would then be 426 barrels. If the gravity method had been used, normally 565 barrels of products would have been diverted from this interface region to insure that the gasoline was held within the permissible limits of contamination.

It is apparent that the radioactive tracer method described herein enables a pipeline operation to be carried out more economically and efficiently than the methods normally used heretofore. Not only does it result in an increase in the usable quantities of individual products that can be diverted from a common pipeline, with a concomitant decrease in downgrading or reworking of products, but also it relieves the station operator from necessity of spending much time sampling the products flowing through the line to catch the interface and determine the proper point for diversion of the various components of the stream.

Although the inventive concept has been described herein as applied to a petroleum products pipeline operation, it will be apparent that the radioactive tracer method can be applied to conduits carrying other types of products, or to streams of other materials, and it is intended that the invention embrace all applications and modifications within the limits of the appended claims.

We claim:

1. The method of operating a pipeline through which is transported a mulitiplicity of fluid substances in sequential adjacent relationship to divert from the pipeline at a point remote from the beginning thereof preselected substances substantially separate from adjacent substances, comprising interspersing a radioactive material between adjacent substances at the beginning of said pipeline, transporting said substances and said interspersed radioactive material through said pipeline to the remote point, placing a detector for radioactivity at said remote point, placing a second detector for radioactivity at a station spaced apart from said remote point and in a position to be actuated by said radioactive material prior to the time said radioactive material arrives at said remote point, transmitting to said remote point prior to the arrival of said interface region at said remote point the wave form of variations of said radioactive material as detected at said station, and diverting said preselected substances from said pipeline at said remote point in accordance with the relative position of a preselected variation of said wave form of said radiocative material with respect to said preselected substances as determined at said station.

2. The method for determining the concentration of one fluid substance at a point in a region of intermixing between two fluid substances flowing through a common conduit in sequential adjacent relationship, comprising placing a radioactive tracer material in the interface between the said two fluid substances, transporting said substances through said conduit to a preselected location, determining at said preselected location the wave form of radioactivity produced by the distribution of said radioactive tracer material in said region of intermixing, determining the width of the half-wave of said wave form at some fraction of the peak value of said wave, determining a width parameter for said wave in accordance with the relationship $$-\log_e f = \left(\frac{w_f}{2w}\right)^2$$

where
$w_f$=width of the half-wave
$f$=fraction of peak value
$w$=width parameter and determining the concentration of the said one fluid substance at said point from the relationship $$C = \frac{1}{\sqrt{\pi w}} \int_{-\infty}^{x} \exp\left[-\left(\frac{x}{w}\right)^2\right] dx$$

where
$x$=the distance of the point from the plane of the interface
$C$=the concentration of the substance 3. The method for determining the volume of one fluid substance in a portion of a region of intermixing between two fluid substances flowing in sequential adjacent relationship through a common conduit, comprising placing a radioactive tracer material in the interface between the said two fluid substances, transporting said substances through said conduit to a preselected location, determining at said preselected location the wave form of radioactivity produced by the distribution of said radioactive tracer material in said region of intermixing, determining the width of the half-wave of said wave form at some fraction of the peak value of said wave, determining a width parameter for said wave in accordance with the relationship $$-\log_e f = \left(\frac{w_f}{w}\right)^2$$

where
$w_f$=width of the half-wave
$f$=fraction of peak value
$w$=width parameter determining the concentration of the said one fluid substance in the said region of intermixing from the relationship $$C = \frac{1}{\sqrt{\pi w}} \int_{-\infty}^{x} \exp\left[-\left(\frac{w}{w}\right)^2\right] dx$$

where
$x$=the distance from the plane of the interface
$C$=the concentration of the substance at distance $x$ and determining the volume of the said one fluid substance in the said portion of the region of intermixing from the relationship $$Q = \pi r^2 \int_{-\infty}^{x} C\, dx$$

where $r$=radius of the conduit.

4. The method of operating a pipeline through which is transported different fluid substances in sequential adjacent relationship to divert therefrom at a station on said pipeline preselected substances containing predetermined amounts of adjacent substances, comprising inserting a radioactive material in an interface region between two adjacent substances, transporting said substances through said pipeline, determining the wave form of variations of distribution of said radioactive material in said interface region after said substances have been transported, determining the variations of intermixing of said substances with relation to said variations of distribution of said radioactive material, and diverting preselected substances from said pipeline in accordance with the said variation of said radioactive material.

5. The method of determining the degree of mixing at various points in a zone of intermixing between two known adjacent substances transported through a common pipe line comprising the steps of placing a radioactive tracer material between a first transportation of said adjacent substances, locating a radiation detector at a predetermined station on said pipe line, determining the wave form of variation in activity produced by the influence of said radioactive tracer material on said detector as said radioactive material is transported past said station, determining by physical measurement the degree of mixing at various points in said zone of intermixing at said station, determining the variations in radioactivity in said zone of intermixing with relation to the degree of mixing determined by physical measurement, and subsequently employing the variations in the wave form of radioactivity at said station of a radioactive tracer placed between other transportations of said known adjacent substances as a measure of the degree of mixing between said adjacent substances.

6. The method of operating a pipe line through which is transported a multiplicity of fluid substances in sequential adjacent relationship to divert therefrom at a station on said pipe line preselected substances, comprising placing a radioactive material in the region between two adjacent substances prior to the time said region is transported to said station, placing a first detector for radioactivity in proximity to said pipe line and in a position to be actuated by said radioactive material prior to the time said region arrives at said station, placing a second detector for radioactivity in proximity to said pipe line at said station, transmitting to said station the wave form of variations of radioactivity of said radioactive material as detected by said first detector, determining from said variations a value at which preselected substances will be diverted from said pipe line, and diverting said substances from said pipe line when said second detector detects the said determined value of radioactivity.

7. The method of operating a pipe line to determine the amount of intermixing at a point in the interface region between two known contiguous products flowing through said pipe line in sequential adjacent relationship, comprising the steps of placing a radioactive tracer material in the interface region between said products, locating a radiation detector at a station on said pipe line, transporting said interface region past said detector, determining the wave form of variations in radioactivity of said interface region as it is transported past said detector, determining by physical measurement the amount of intermixing of said products in the interface region at the location of said station, determining the wave form of variations of radioactivity in said interface region with relation to the amount of mixing determined by physical measurement, subsequently transporting through said pipe line contiguous products similar to the first said contiguous products and containing a radioactive tracer in the interface region between them, and employing the wave form variations of radioactivity in the interface region of the subsequently transported products as a measure of the amount of mixing between said products.

8. The method of operating a pipe line through which is transported a multiplicity of fluid substances in sequential adjacent relationship to control the amount of contamination by adjacent fluid substances in preselected fluid substances diverted from said pipe line at a point remote from the beginning thereof, comprising interspersing a radioactive material between adjacent substances at the time said substances are placed within the pipe line, transporting said substances and said interspersed radioactive material through said pipe line to said remote point, placing a detector for radioactivity at said remote point, placing a second detector for radioactivity at a station spaced apart from said remote point and in a position to be activated by said radioactive material prior to the time said radioactive material arrives at said remote point, transmitting to said remote point the wave form of variations of radioactivity occurring in the detection of said radioactive material at said station, determining at said remote point from said wave form of variations at said station the positions in the pipe line of said preselected substances in relation to said radioactive material, detecting said radioactive substance at said remote point, and diverting from the pipe line at said remote point said preselected substances in accordance with the relative positions of said preselected substances and said variations in the wave form of said radioactive material as determined at said station.

9. The method in accordance with claim 4, in which the said radioactive material comprises radioactive triphenylstibine.

10. The method in accordance with claim 5, in which the said radioactive tracer material comprises radioactive triphenylstibine.

11. The method in accordance with claim 6, in which the said radioactive tracer material comprises radioactive triphenylstibine.

References Cited in the file of this patent

UNITED STATES PATENTS

| | | |
|---|---|---|
| 2,453,456 | Piety | Nov. 9, 1948 |
| 2,534,352 | Herzog | Dec. 19, 1950 |
| 2,631,242 | Metcalf | Mar. 10, 1953 |